Dec. 31, 1935.  A. HERZ  2,025,745
VISIBLE DATE SCHEDULING APPLIANCE
Original Filed Aug. 26, 1927
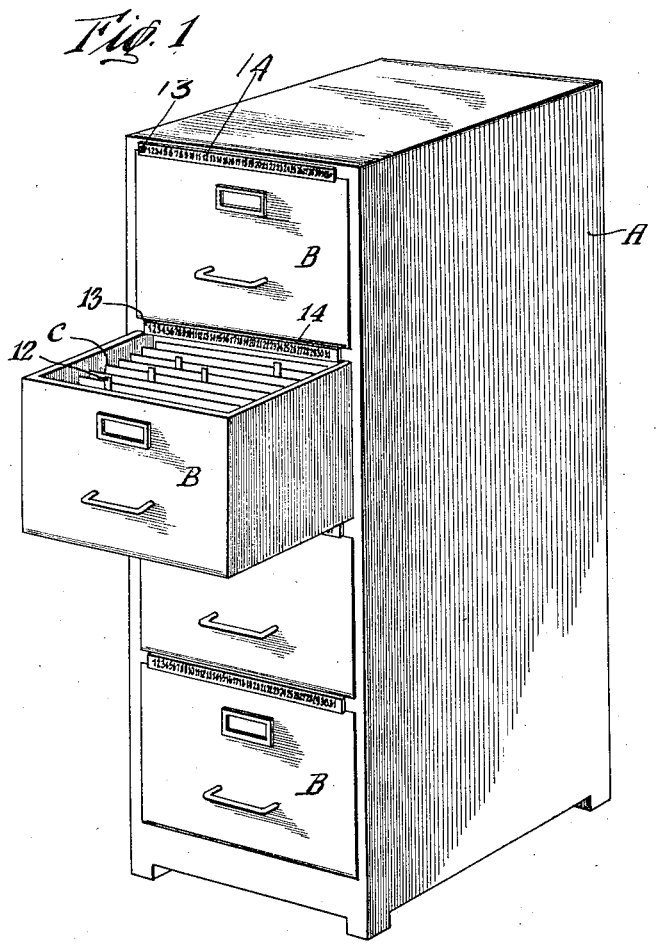
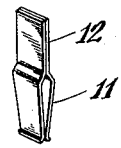
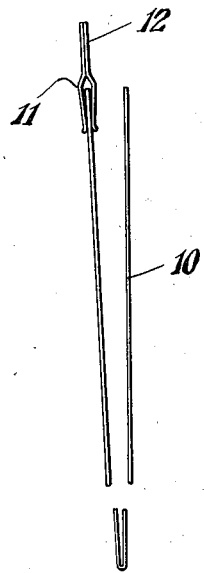
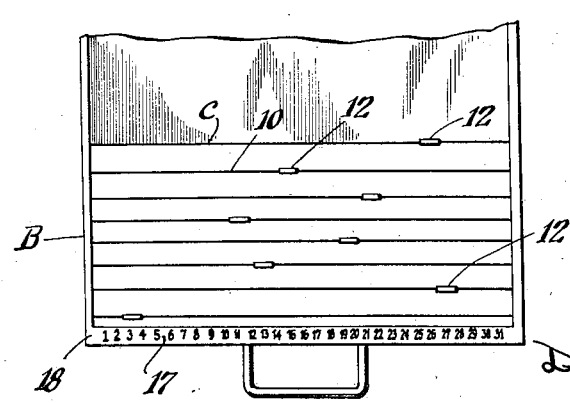
INVENTOR
*Alexander Herz*
BY
*Daniel L. Morris*
ATTORNEY Patented Dec. 31, 1935

2,025,745

UNITED STATES PATENT OFFICE 2,025,745

VISIBLE DATE SCHEDULING APPLIANCE

Alexander Herz, New Rochelle, N. Y.

Original application August 26, 1927, Serial No. 215,544. Divided and this application September 21, 1933, Serial No. 690,350

2 Claims. (Cl. 129—16)

This is a division of my co-pending application Serial No. 215,544, filed August 26, 1927, and patented Oct. 17, 1933, No. 1,931,224, for Visible date scheduling appliance.

This invention relates to a visible date scheduling or date affixer and finder appliance for use in business filing systems, wherein compiled business data under a filing classification may be checked without the removing of the data from its place of deposit at determined intervals, preferably correspondingly to the number of days of each month period, whereby that date requiring attention at a particular period within a month or year will be ascertainable at a glance on that period or on an advanced date. In that manner a person shall be relieved of constantly inspecting the data to ascertain the time it will demand action or relying upon the memory for so doing, and thus avoid possibility of inattention thereto beyond the time period fixed or set for such action prescribed thereto.

With this aim in view follow-ups, notices and other related service can be accomplished with dispatch as well as with accuracy and certainty. In connection with the filing of papers such as correspondence, notices, sales memoranda or other like data, etc. incident to the handling of businesses, the checking of the same becomes negligible as the data, so to speak, is buried from observation. To bring the subject matter foremost for attention at or near a given time and maintain a service with any degree of accuracy it is required to individually inspect the records so often within prescribed periods that the cost for operating and maintenance of the filing system becomes excessive and at the same time there exists the factor of uncertainty in following up and notification being issued after the required periods through a calendar year or other computed time.

The present invention contemplates eliminating the aforesaid contingencies prevalent in the filing systems now in use with the result that filed data will be grouped and identified at sight for attention or action at a prescribed period or a particular day of a month within the year. In carrying out the invention there are series or groups of clips forming tabs arranged in a set, those of each series or group being tinted or otherwise finished to distinguish them from any of the other groups, the clips in each group by color or finish being indicative of a month period of the year so that the set preferably includes 12 series of groups differently colored or finished from each other, and the clips of the entire series or groups will identify the respective months of a calendar year.

Upon the filing cabinet or other depository for containing the business data is a scale set with numerals consecutively arranged corresponding to the number of days of a month, the scale being located to cooperate with selected clips when attached to a file, jacket or other container for data within the cabinet, to visually mark and signify a determined date for action to be taken with respect to such data in a given space in said cabinet without requiring individual inspection of such data or the removal thereof from the space. The clips are placed relative to the data by the use of a gauge element applicable to the exposed edge of the file, jacket or other container for the data, whereby the applied clips constituting markers will coincide or align with selective numerals upon the scale for definitely affixing a visual indication of the period of time for action to be had respecting the data, and in this manner automatical dating of contents within the cabinet or other depository will be effected over a definite period of time.

The invention further aims to generally improve filing devices, their systems and mode of operation and particularly to produce one which can be operated with a minimum of effort on the part of a user and in which the possibility of involuntary error is eliminated to a maximum degree.

The invention will be fully described hereinafter, reference being had to the accompanying drawing in which:

Figure 1 is a perspective view of a conventional form of filing cabinet, with one of its drawers open, showing the appliance constructed in accordance with the invention associated therewith.

Figure 2 is a detailed perspective view of one of the clip members of the appliance.

Figure 3 is a fragmentary end view of a folder for data showing a clip attached thereto to present a tab therefor.

Figure 4 is a fragmentary top plan view of one of the drawers of the cabinet showing the date scale applied to its front top edge, this being a modification of the construction illustrated in Figure 1 of the drawing.

Similar reference characters indicate corresponding parts throughout the several views in the drawing.

Referring to the drawing in detail, for the purpose of illustrating the preferable construction, application and manner of use of the data affixing and finder appliance, there has been shown in Figure 1 of the drawing, a drawer B adapted for use in a conventional filing cabinet, of the usual construction. As is customary in the use of each drawer B there is arranged within the same a plurality of followers or dividers C, each being of the ordinary form to separate the drawer interiorly thereof into independent spaces for accommodating data or retaining mediums therefor, such as a temporary file or folder 10 into which is introduced compiled data for reception within the file cabinet and accessible at all times to the user thereof. The cabinet (not shown), its drawers B, followers or dividers C and the files or folders 10 form no part of the present invention except as intermediaries in carrying out the purpose and operation thereof. Therefore, these parts may be varied or changed according to the customs in business filing systems.

The date affixing and finder appliance comprises preferably a series or groups of clips forming time period markers, an example of one of the same being indicated at 11 and the marker clips of the respective groups or series are colored or finished in part or wholly distinctively from each other so that the clips in any one group can be visually distinguished from the clips of another group. For example, the clips 11 in one group may be finished or surfaced black and the same being symbolical of the month of January. The clips of the next group may be colored orange indicative of the month February; the next group of clips may be colored green indicative of the month of March; the clips of the next group may be surfaced or finished white indicative of the month April; the clips of the next group may be colored maroon and indicative of the month May; the clips of the next group may be colored pale blue and indicative of the month June; the clips of the next group may be colored blue and white and indicative of the month July; the clips of the next group may be colored red and indicative of the month August; the clips of the next group may be colored dark blue and indicative of the month September; the clips of the next group may be colored pink and indicative of the month October; the clips of the next group may be colored brown and indicative of the month November, and the clips of the final group may be colored yellow and indicative of the month December of the calendar year. Of course it is optional in the changing of the colorings or surfacing of these groups, as varying combinations of colors or other finishes may be carried forth, yet it is essential that the clips 11 of the respective groups be distinguished from the clips of other groups and that their distinguishing characteristics serve as identifications of the different months of a calendar year, whereby observation had of the clip in any one group will mentally convey to a person a particular month of the year.

Each clip is of a size and shape to provide a visible extension tab 12. These clips 11 with the extension tabs 12 are designed for detachable engagement on the upper edge of either the followers or dividers C or the files or folders 10 massing the data within the drawer B, with the extension tabs 12 projecting a distance above to expose the characteristics of same for observation to identify a particular date in a manner presently described.

The clips 11 having the extension tabs 12 may be of any number, and may be used to designate the respective groups or series of data according to the volume of compiled data to be retained within the spaces for their storage within the drawer B of the cabinet so that each group of data may carry extension tabs 12 of a particular kind for the visual identification of the month to which it pertains. Each drawer carries a date scale, the same being calibrated numerically from 1 to 31 with the numerals displayed thereby corresponding to the days of the month period of a calendar year, these numbers being spaced at the required distance apart so that the scale will extend substantially the width of the drawer, whereby the extension tabs 12 of the clips 11 when engaged with the followers or dividers C or files or folders 10 will register selectively with the numerals 14 upon said scale, thus signifying a particular month date by the finish or color characteristic of the clip and the day date within said month by the numeral registering or coinciding with the location of the clip 11 and its extension tab 12. The tabs 12 when carried upon the followers or dividers C or files or folders 10 cooperate with the scale to indicate a particular day date and a month designation, thereby visually signalling that the data confined within the tabbed space requires attention or action under the finder date created by the appliance.

A gauge bar may be provided, the same having date indicia corresponding to the scale and this gauge is manually handled so that a person can apply the same to the upper exposed edge of the followers or dividers C or files or folders 10 for the accurate locating of the clips 11 thereon for affixing a visible date through the cooperation of the tab extension 12 with the scale 13 in a manner as hereinbefore set forth.

In Figure 4 there is shown a slight modification of the application of the date scale 17 wherein the latter is carried upon the top front edge 18 of the drawer B, the position of the scale 17 being horizontal in contradistinction to the vertical disposition of the scale 13 upon the cabinet. This scale 17 coacts with the clips 11 and their tab extensions 12 in a manner similar to the scale 13.

It will be appreciated that the invention is not confined to the specific constructions and variations described but that many modifications and alterations may be made therein without departing from the invention. For example, the location of the date scale may be altered and the manner in which it is placed in the cabinet may be changed within wide limits. The invention is not restricted to a means to date files in a cabinet, but can be extended to be used as an "evidence of sentinel system" for the keeping of stock records, and other items. The invention can also be utilized on any vertical card index, and similar devices and is in general capable of wide application.

I claim:

1. In an appliance of the kind described comprising a cabinet enclosure and a drawer therefor, a plurality of record members, said drawer being adapted to contain said record members, distinctively marked marker elements adjustably positioned on said record members, said marker elements being relatively distinguishable and indicative of determined periods, and a suitably marked date scale positioned on the front of said cabinet above the top edge of said drawer, the marker elements being adapted to cooperate with said marked date scale to signify dates within the periods indicated by said marker elements.

2. In an appliance of the kind described, a drawer, a support therefor, dividers in said drawer, distinctively marked marker elements on said dividers, and a suitably marked date scale mounted on the drawer support and immovable with relation thereto, the marker elements being adapted to cooperate with the markings on the said date scale to signify dates within periods indicated by the said marker elements, the marker elements being relatively distinguishable and indicative of determined periods.

ALEXANDER HERZ.